3,168,557
HALOGENATED BENZYLAMINE-4-CARBOXYLIC ACIDS
Edward W. Pietrusza, Morris Township, Morris County, and Jack R. Pedersen, Morristown, N.J., assignors to Allied Chemical Corporation, New York, N.Y., a corporation of New York
No Drawing. Filed Apr. 2, 1962, Ser. No. 184,546
10 Claims. (Cl. 260—518)

This invention relates to halogenated amino acids and the method of their preparation. More particularly it relates to halogenated benzylamine-4-carboxylic acids and chlorides and polymers thereof.

These halogenated amino acids are new compounds which have been found to be useful in the preparation of high melting homopolymers. They can also be used in the preparation of copolymers when condensed with other monomers such as caprolactam, the adipic acid salts of hexamethylene diamine, xylylene diamine, etc.

The halogenated amino acids of this invention can be prepared by the halogenation of benzylamine-4-carboxylic acid in the presence of a trace of iodine after the amine group has been blocked by conversion to the acid salt.

The mineral acid salt of the amine is formed first in order to block the amine group from the action of the halogen. This can be accomplished in a simple manner by adding the amine to a dilute solution of the mineral acid such as sulfuric or hydrochloric acid. The salt so formed precipitates therefrom.

When chlorine is the halogen to be used, the reaction temperature is preferably held between 110 to 120° C. The reaction may be written as follows:

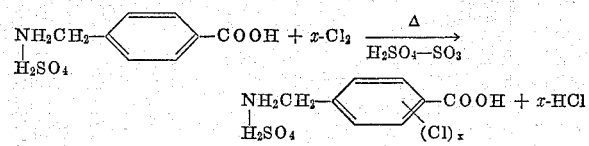

$x = 1-4$.

The following examples are illustrative of this reaction. "N.E.," in the analyses, is the neutralization equivalent.

*Example 1*

Tetrachloro benzylamine-4-carboxylic acid was prepared from benzylamine-4-carboxylic acid by dissolving 25 parts by weight of its sulfuric acid salt in 192.7 parts by weight of 26% oleum, introducing the solution into a reaction vessel to which a trace of iodine, 0.5 part by weight had been added, and slowly passing chlorine therethrough for a period of 10 hours while maintaining the temperature within the range of 110 to 120° C. An additional 0.5 part by weight of iodine was added during the course of the reaction. After cooling to 80° C., air was caused to pass over the solution to drive off the excess sulfur trioxide. About 50 parts by weight of water were then added and the reaction mixture poured onto about 300 parts by weight of crushed ice whereupon a yellowish-white solid was immediately formed. The product was filtered and washed twice in cold water. The wet precipitate so obtained was then dissolved in a dilute base (8 parts by weight of sodium hydroxide per 300 parts by weight of water). The solution so obtained was then contacted with decolorizing carbon and the product isolated by treating the solution with $CO_2$ for 1½ hours. The tetrachloro benzylamine-4-carboxylic acid obtained was filtered and dried to constant weight in an oven at 60° C. The melting point of the material lay between 315–317° C. The yield obtained was 89%.

*Analyses.*—Calculated for $C_8H_5NO_2Cl_4$: Cl, 49.50%; N, 4.85%; N.E.=288.8. Found: Cl, 48.27±0.05%; N, 4.78±0.06%; N.E.=285.6±.8.

The tetrachloro benzylamine-4-carboxylic acid can also be recrystallized from ammonium hydroxide. In such cases the crude halogenated amino acid is dissolved in concentrated ammonium hydroxide (28% ammonia), 4 parts ammonium hydroxide are used per part of chloroamino acid and the solution is decolorized and filtered. The excess ammonia is then removed by applying heat and purging with steam or nitrogen or other inert gas. When most of the ammonia is removed, and almost quantitative yield of the halogenated amino acid precipitates.

N-acetyl tetrachloro benzylamine-4-carboxylic acid was prepared from the amino acid by dissolving 10 parts by weight of the halogenated amino acid in a dilute basic solution (1.4 parts by weight of sodium hydroxide per 100 parts by weight water). Excess acetic anhydride, 4.3 parts by weight, was added and the solution then titrated with 6 N HCl until precipitation occurred. The N-acetyl derivative was filtered and dried to constant weight. It was found to have a melting point of 257–258° C.

*Analyses.*—Calculated for $C_{10}H_7NO_3Cl_4$: Cl, 42.80%; N, 4.23%; N.E.=330.8. Found: Cl, 41.63±0.01%; N, 3.94±0.18%; N.E.=324.6±0.7.

*Example 2*

The monochloro benzylamine-4-carboxylc acid and mixtures of chlorinated amino acids were prepared using essentially the same procedure given above for the tetrachloro compound, the only difference being that the time of reaction and the amount of chlorine introduced were varied. The following are some of the results obtained.

| Chlorination Time at 110–20° C. | Percent Cl in Product Isolated | Remarks |
|---|---|---|
| 1 hr | 5.7 | |
| 2.5 hrs | 11.8 | |
| 2.5 hrs | 15.4 | |
| 3.0 hrs | 18.7 | M.P. of 298–300° C. monochloro-amino acid. (Calcd. for $C_8H_8NO_2Cl$: Cl, 19.1%.) |

When bromine is the halogen to be used, the reaction temperature is preferably maintained between 60 and 90° C. The reaction may be written as follows.

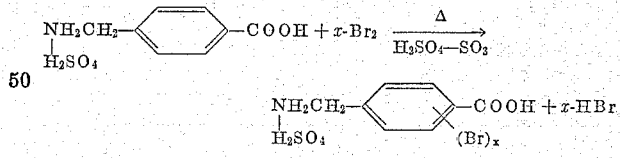

$x = 1-4$.

*Example 3*

25 parts by weight of the sulfuric acid salt of benzylamine-4-carboxylic acid were dissolved in about 199 parts by weight of 65% oleum. The mixture was heated to 60° C. whereupon 40 parts by weight of bromine containing 0.5 part by weight of iodine was slowly added to the mixture over a three-hour period. The temperature was then raised to 70° C., held there for 1 hour, and slowly raised to 90° C. Air was then blown over the surface of the solution to drive off the excess sulfur trioxide. Some water, about 50 parts by weight, was carefully added to the reaction vessel whereupon the reaction mixture was poured over 350 parts by weight of crushed ice. A precipitate was immediately formed. The brominated product was then isolated and purified in the manner described above in Example 1 for the tetrachloro amino acid derivatives. The yields obtained by this method ranged between 90–97%. The melting point of the product lay between 305–310° C.; it is principally tribromo benzylamine-4-carboxylic acid.

*Analyses.*—Calculated for $C_8H_6NO_2Br_3$: Br, 62.2%; N, 3.6%. Calculated for $C_8H_5NO_2Br_4$: Br, 68.3%; N, 3.0%. Found: Br, 63.61±0.24%; N, 2.80±0.02%.

This product was used in the preparation of N-acetyl tribromo benzylamine-4-carboxylic acid by dissolving 10 parts by weight of the product in dilute basic solution. (1.1 parts of sodium hydroxide per 100 parts by weight of water.) Excess acetic anhydride (about 3 parts by weight) was added and the solution then titrated with 6 N HCl until precipitation occurred. The N-acetyl derivative was then filtered and dried to constant weight. It had a melting point lying within the range 250–253° C.

*Analyses.*—Calculated for $C_{10}H_8NO_3Br_3$: Br, 54.6%; N, 3.2; N.E.=430. Calculated for $C_{10}H_7NO_3Br_4$: Br, 63.0%; N, 2.75%; N.E.=509. Found: Br, 57.84±0.12%; N, 2.48±0.07%; N.E.=415.5±1.0.

Example 4

The monobromo benzylamine-4-carboxylic acid was prepared in accordance with the procedure given in the above example. It was prepared under substantially the same conditions with the use of the following amounts of reagents.

|   | Parts by weight |
|---|---|
| Benzylamine-4-carboxylic acid·$H_2SO_4$ | 25 |
| 65% oleum | 79.6 |
| Iodine | 0.5 |
| Bromine | 10 |

The yield of monobromo benzylamine-4-carboxylic acid was 80.0%. It had a melting point of 298° C.

*Analyses.*—Calculated for $C_8H_8NO_2Br$: Br, 34.8%. Found: 33.4%.

It has been found that mixtures of amino acids with from 5 up to 68% bromine content can be prepared by varying the time of reaction and the amount of bromine used.

The following examples are illustrative of the manner in which the halogenated compounds of this invention can be used in making polymers.

Example 5

Mixtures of ε-caprolactam, halogenated benzylamine-4-carboxylic acid and amino methyl cyclohexane-4-carboxylic acid in the proportions given in the table below were polymerized in the absence of water with a nitrogen sweep and with no agitation. The charge was heated from 90 to 260° C. in a period of 2 hours, after which the temperature was maintained there for about 4 hours. The resulting polymer, after cooling, was ground to a 5–20 mesh particle size and water washed. The following table sets forth certain observations which have been made with respect to polymers prepared with the use of the halogenated compounds in the manner set forth above.

| Parts by Weight: | | | | |
|---|---|---|---|---|
| ε-caprolactam | 5 | 4 | 9 | 9 |
| Chlorinated benzylamine-4-carboxylic acid (7.6% Cl) | 2.71 | 3.25 | | |
| Amino methyl cyclohexane-4-carboxylic acid | 2.5 | 3.0 | | |
| Monochloro benzylamine-4-carboxylic acid | | | 1.0 | |
| Monobromo benzylamine-4-carboxylic acid | | | | 1.0 |
| Polymer melting point, °C | ca. 215 | ca. 235 | 203–208 | 204–205 |
| Reduced viscosity of the polymer in a dilute m-cresol solution | 0.96 | 0.92 | (¹) | 0.56 |

¹ Insol. in m-cresol.

Example 6

Halogenated benzylamine-4-carboxylic acids can be polymerized by an aqueous-organic suspension technique in accordance with which the halogenated compound is suspended in $POCl_3$ (125 parts) and converted to its acyl chloride salt by adding $PCl_5$ (21 parts) to the suspension containing 17 parts of the halogenated compound (monochloroamino acid was used in this example). The mixture is thereupon heated to reflux at a temperature of 75–110° C., until evolution of the hydrogen chloride ceases and a clear solution is formed. This normally occurs within two hours. The $POCl_3$ is then removed by distillation under reduced pressure and the residual acyl halide is washed and dried in toluene and isolated.

For example, one part by weight of the acyl chloride salt.

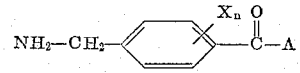

was dissolved in one part of difluochloroacetic acid which was then diluted with dry benzene (5 parts). At room temperature, this solution was then added to 20 wt. percent aqueous KOH with agitation. Polymerization occurred and a precipitate was formed which was removed by filtration. The filtered material was washed thoroughly with hot water and dried. The polyamide obtained in this manner melts with decomposition at 300–310° C., and possesses a weight average molecular weight of 470,000 as determined by light scattering in formic acid solution.

Polyamides from the tetrachloro- and tetrabromobenzylamine-4-carboxylic acids can be prepared in a similar manner.

A homopolymer was prepared by the same procedure from monobromobenzylamine-4-carboxylic acid via the acyl chloride salt. This product melts at 300–315° C. and possesses a weight average molecular weight of 170,000 as determined by light scattering in formic acid solution.

Polyamides produced by the processes of Examples 5 and 6 are useful in the manufacture of films, coatings and fibers.

Although oleum is the only solvent specified for use in dissolving the acid salts of the benzylamine carboxylic acid, other solvents, such as phosphoric acid, chloracetic acid, phosphorus oxy chloride, etc. could also be used.

Although certain preferred embodiments of the invention have been disclosed for purposes of illustration, it will be evident that various changes and modifications may be made therein without departing from the scope and spirit of the invention.

We claim:

1. Halogenated 4-aminomethylbenzoyl compounds of the structural formula

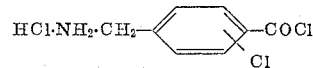

wherein X represents a halogen atom and $n$ represents a cardinal number from 1 to 4 inclusive and A represents a substituent of the group consisting of hydroxyl and chloride.

2. Chlorinated benzylamine-4-carboxylic acids of the structural formula

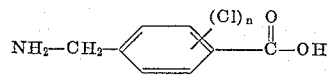

wherein $n$ represents a cardinal number from 1 to 4 inclusive.

3. The compound monochloro benzylamine-4-carboxylic acid.

4. The compound tetrachloro benzylamine-4-carboxylic acid.

5. Brominated benzylamine-4-carboxylic acids of the structural formula

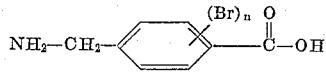

wherein $n$ represents a cardinal number from 1 to 4 inclusive.

6. The compound monobromo benzylamine-4-carboxylic acid.

7. The compound tribromo benzylamine-4-carboxylic acid.

8. The method of preparing halogenated benzylamine-4-carboxylic acids which comprises adding benzylamine-4-carboxylic acid to a mineral acid solution thereby forming the salt of the amine, dissolving the salt in a solvent and halogenating the salt in the presence of a trace of iodine thereby forming the halogenated benzylamine-4-carboxylic acid.

9. The method of preparing chlorinated benzylamine-4-carboxylic acid which comprises adding benzylamine-4-carboxylic acid to a sulfuric acid solution thereby forming the salt of the amine, dissolving said salt in oleum and chlorinating said salt in the presence of a trace of iodine at a temperature between about 110–120° C. thereby forming chlorinated benzylamine-4-carboxylic acid.

10. The method of preparing brominated benzylamine-4-carboxylic acid which comprises adding benzylamine-4-carboxylic acid to a sulfuric acid solution thereby forming the sulfuric acid salt of the amine, dissolving the salt in oleum, brominating said salt in the presence of a trace of iodine at a temperature between about 60–90° C. thereby forming brominated benzylamine-4-carboxylic acid.

References Cited in the file of this patent

UNITED STATES PATENTS

| | | |
|---|---|---|
| 2,859,242 | Moyle | Nov. 4, 1958 |
| 2,868,769 | Graham | Jan. 13, 1959 |
| 2,910,457 | Temin et al. | Oct. 27, 1959 |
| 2,989,495 | Hare et al. | June 20, 1961 |
| 3,037,002 | Pietrusza et al. | May 29, 1962 |
| 3,051,745 | Obendorf | Aug. 28, 1962 |